(12) United States Patent
Zhuang

(10) Patent No.: US 7,663,331 B2
(45) Date of Patent: Feb. 16, 2010

(54) ADJUSTER FOR ADJUSTING DRINK TEMPERATURE

(76) Inventor: Min Zhuang, No. 68, Jin Hu Road, Shantou, Guangdong (CN) 515000

( * ) Notice: Subject to any disclaimer, the term of this patent is extended or adjusted under 35 U.S.C. 154(b) by 376 days.

(21) Appl. No.: 11/791,779

(22) PCT Filed: Nov. 25, 2005

(86) PCT No.: PCT/CN2005/002014

§ 371 (c)(1),
(2), (4) Date: Aug. 8, 2007

(87) PCT Pub. No.: WO2006/056137

PCT Pub. Date: Jun. 1, 2006

(65) Prior Publication Data

US 2007/0289977 A1    Dec. 20, 2007

(51) Int. Cl.
*H02P 3/00* (2006.01)
(52) U.S. Cl. .............. 318/558; 220/592.16; 220/592.01
(58) Field of Classification Search ............ 318/558; 220/592.01, 592.16
See application file for complete search history.

(56) References Cited

U.S. PATENT DOCUMENTS 5,002,201 A * 3/1991 Hancock et al. ............... 222/61
6,662,574 B2 * 12/2003 Loibl et al. .................... 62/64

FOREIGN PATENT DOCUMENTS

| CN | 2205163 Y | 8/1995 |
|---|---|---|
| CN | 2327295 Y | 7/1999 |
| CN | 2582507 Y | 10/2003 |
| CN | 2601606 Y | 2/2004 |
| JP | 6-40477 A | 2/1994 |

\* cited by examiner

*Primary Examiner*—Bentsu Ro
*Assistant Examiner*—David S Luo
(74) *Attorney, Agent, or Firm*—Patterson, Thuente, Skaar & Christensen, P.A.

(57) ABSTRACT

The present invention relates to an adjuster for adjusting drink temperature, including a base, a container arranged on the base, a stay bar seating fixed on the base and extending into the container from the base of the container and secured to the container, a stay bar device arranged in the stay bar seating and formed as a muff coupling with the stay bar seating without liquid leakage, one end of thereof extending out of the stay bar seating and the other end forming the driving end, and an actuating device cooperating with the driving end of the stay bar device to drive the stay bar device.

17 Claims, 6 Drawing Sheets

ADJUSTER FOR ADJUSTING DRINK TEMPERATURE

RELATED APPLICATIONS

This application claims priority to PCT Application No. PCT/CN2005/002014 filed Nov. 25, 2005, and Chinese Application No. 200420095995.6 filed Nov. 29, 2004, the disclosures of which are hereby incorporated by reference in their entireties.

FIELD OF INVENTION

The present invention relates to an adjuster for adjusting drink temperature. In particular, it relates to an adjuster for adjusting drink temperature by using liquid as a heat medium, in which the adjuster can provides liquid flows, and increases or decreases the drink temperature equably and rapidly by employing the liquid temperature. More particularly, it relates to an adjuster for adjusting drink temperature, in which the drink in the bottle is driven by a motor, the liquid medium is circulated around the bottle via an up and down movement of the bottle. It is realized that drink temperature is consistent with liquid temperature, so that the adjusting speed is improved, further, an animated effects is presented, and the drinking appetite is inspired.

BACKGROUND OF INVENTION

People are used to drink, especially in the holidays. Drinks can add attraction to the festival. Also, people are used to drink daintily. For example, wine requires lower temperature to improve the taste, thus, people usually cool down the wine in ice water when they are drinking; for some other wines, people prefer to drink warmly in the winter, so that they warm up the wines in warm water.

In the prior arts, there are some apparatus such as icing drink apparatus and warming drink apparatus. For example, for the icing drink apparatus, such as an ice bucket, ice and water are put in the bucket, then the wine or beer is put in ice water; another example is an ice cup, in which the water is filled between the inner layer and the outer layer of the cup, and the water is frozen to be ice, then the drinks are filled in the cup and become iced drink. As an example of a drink warming apparatus, there is a warm bottle disclosed in Chinese Patent No. 02244887.X, in which the warm water is filled in the outer bottle, and drinks are filled in the inner bottle, and then the inner bottle is put inside the outer bottle. As another example, in a drink warming device disclosed in Chinese Patent No. 98203364.8, an electric heater unit is set in the base of the device, and the temperature is controlled in a desired range by a temperature control unit, and so on.

In such an apparatus, bottles are affixed in respect to the apparatus, thus, it looks stiffly, vapidly and without fun; at the same time, in such apparatus, water or ice is used as heat carrier and the heat is transferred via the bottle. Although the medium is liquid, the liquid is in relatively static state, so that the efficiency of icing drink or warming drink is relatively low, especially using water and ice together as the medium.

SUMMARY OF INVENTION

Accordingly, an object of the present invention is to provide an adjuster for adjusting drink temperature, wherein the bottled drink has a linear forward and reverse movement in the liquid during the adjusting process, which can inspire drinking appetite and increase and decrease drink temperature expeditiously.

Another object of the present invention is to provide an adjuster for adjusting drink temperature by using ice-watered mixture to ice drink.

Furthermore, a further object of the present invention is to provide an adjuster for adjusting drink temperature. In order to bring a waterfall effect and have fun drinking, the adjuster employs a variety of liquid positions caused by the fluctuation of the bottle to bring up a falling difference around the bottle. At the same time, it is achieved that the temperature of liquid is uniform and consistent by forcing the circulation of the liquid, thus, it can further increase and decrease drink temperature expeditiously.

In addition, a still further object of the present invention is to provide an adjuster for adjusting drink temperature which will fit any size of bottle. It can solve the problem of different interval caused by different bottle size, and the problem of, when interval is large, the liquid in the interval become refluent rather than producing a waterfall by overflow is also solved.

At least one aspect of the above objects is realized by providing an adjuster for adjusting drink temperature, comprising a base, a container arranged on the base, a stay bar seating fixed on the base and extending into the container from the base of the container and fixed to the container, a stay bar device arranged in the stay bar seating and formed as a muff coupling with the stay bar seating without liquid leakage, one end thereof extending out of the stay bar seating and the other end forming the driving end, and an actuating device cooperating with the driving end of the stay bar device to drive the stay bar device.

When the adjuster is in use, the bottle is put in the container, and the base of bottle is disposed on the stay bar device. Ice water or warm water is filled in the container, as a reduction motor operates a converting mechanism is driven to operate. As a result, rotational movement of the motor is converted to linear movement of the stay bar, causing the stay bar device to perform a reciprocating up and down movement, and driving the bottle moving up and down in the ice water or warm water. The animation effects and inspiring of drinking appetite are achieved, also it is propitious to flow the water and exchange the heat expeditiously.

The adjuster for adjusting drink temperature further includes an inner muff fixed in the container, and the stay bar seating extends out from the base of the muff; and the inner muff is provided with an inlet hole that allows the liquid to flow inside the inner muff through the inlet hole. Thus, ice is put in peripheral section, and water can flow freely in the central section and peripheral section. As the bottle vibrates in the water in the central section, the water flows and exchanges the heat quickly with ice in the peripheral section, so that icing drink is realized expeditiously.

In the adjuster for adjusting drink temperature as above, the inlet hole is arranged on the bottom of the inner muff and provided with a one-directional valve. When the bottle moves down, the pressure to the liquid is increased. Consequently, the one-directional valve is closed. In this condition, the downward movement of the bottle causes the liquid in the inner muff to overflow along an interval between the bottle and the inner muff and flow to the peripheral section of the container. On the other hand, when the bottle is in the upward movement, the pressure applied to the liquid in the inner muff is reduced, and a negative pressure is formed, then, the one-directional valve is opened. In this condition, the liquid in the peripheral section flows from the one-directional valve to the central section and prepares for next overflow. By such repeated circulation, it is realized a process which the liquid in the central section overflows from the top to peripheral section and the liquid in the peripheral section is replenished with that from the central section via the bottom of the inner muff, it brings a waterfall effect and makes the adjuster become more attractive and more fun. Also, it is realized that the temperature of liquid is uniform and consistent, so that it can increase and decrease temperature expeditiously.

In the above adjuster for adjusting drink temperature, a supporting end of the stay bar device supports a tray which divides the inner muff in two sections, and a fluid passage is formed between the two sections, the passing area of the fluid passage is not greater than the passing area of the inlet hole of the bottom of the inner muff, wherein the fluid passage can be an interval which is defined between the tray and the inner muff, or a through aperture having a one-directional valve which is mounted on the tray. The arrangement of the tray can solve the problem in different size of interval between the bottle and inner muff due to different bottle size. Specifically, when the interval is large, backflow is easily generated and it is hard to overflow so as to bring a waterfall. In addition, when the passing area of the fluid passage is not greater than the passing area of the inlet hole on the bottom of the inner muff, the tray moves upwardly, and it will drive the liquid remaining on the top of the tray to overflow from the central section to the peripheral section, so that a continuous waterfall effect is achieved.

The adjuster for adjusting drink temperature further includes a seal muff, wherein one end of the seal muff is coupled and fixed to the stay bar seating and the other end of the seal muff is fixed to the supporting end of the stay bar.

In the adjuster for adjusting drink temperature, the actuating device includes an actuating motor, and a converting mechanism for converting the rotational movement of the actuating motor to a linear reciprocating movement of the stay bar device.

In the adjuster for adjusting drink temperature, the converting mechanism includes a turnplate which is rotated by the driving of the output shaft of the motor; a pin shaft having one end provided eccentrically onto the turnplate; and a guiding path which is connected with the driving end of the stay bar device, and the other end of the pin shaft can slide horizontally in the guiding path.

In the adjuster for adjusting drink temperature as above, the converting mechanism includes a turnplate which is rotated by the driving of the output shaft of the motor; a pin shaft having one end which is connected with the driving end of the stay bar device; and an annular guiding path formed on the turnplate, the other end of the pin shaft is slidably mounted in the annular guiding path.

In the adjuster for adjusting drink temperature, the stay bar device includes a stay bar; a stay bar base, one end of the stay bar is defined as the driving end, and the other end is pivotably connected to the stay bar base; and a stay bar muff which is slidably engaged inside the stay bar seating, and the other end is fixed to the stay bar base. Furthermore, the converting mechanism includes a crank, which is rotated by the driving of the output shaft of the motor; and a pin shaft having one end that is fixed at the supporting end of the crank, and the other end of the pin shaft is pivotably connected to the driving end.

In the adjuster for adjusting drink temperature, the stay bar device includes a stay bar; a stay bar base, one end of the stay bar base is defined as the driving end, and the other end of the stay bar base is pivotably connected to the stay bar seating; and a stay bar muff which is slidably engaged inside the stay bar seating, and the other end is fixed to the stay bar base. Furthermore, the converting mechanism includes a turnplate which is rotated by the driving of the output shaft of the motor; and a pin shaft having one end which is eccentrically provided onto the turnplate, and the other end of the pin shaft is pivotably connected to the driving end.

In the adjuster for adjusting drink temperature, a number of aperture for overflowing are formed on the upper portion of a side wall of the inner muff. Consequently, when the bottle moves downwardly, the liquid in the inner muff rises upwardly, thus the liquid is overflowed through the apertures to bring a waterfall.

In the adjuster for adjusting drink temperature, the container is provided therein with a temperature adjusting device which includes semiconductor refrigerating pieces and semiconductor heating pieces. Thus, by heating or cooling the liquid medium, it is realized that the object of increasing and decreasing the temperature automatically without adding hot water or cold water and ices.

In the adjuster for adjusting drink temperature of the present invention, it is achieved an animation effect by the bottle movement, i.e. a linear reciprocating movement during the icing or heating process, and it can inspire people's drinking appetite, thus presenting its novelty.

In the adjuster for adjusting drink temperature of the present invention, with the linear reciprocating movement, it is realized that the temperature of liquid is uniform and consistent, so that it can increase and decrease temperature expeditiously, thereby presenting its innovation.

According to the present invention, the downward gravity to the bottle can be cancelled by the adjuster through the floatage of liquid exerted to the bottle; it is propitious to save the energy by reducing the force which is required for the linear upward movement of the bottle.

According to the present invention, in order to bring a waterfall effect, the adjuster employs a variety of liquid positions caused by the fluctuation of the bottle to bring up a falling difference around the bottle, thereby the drinking interest is increased, at the same time, forcing the circulation of the liquid can realize that the temperature of liquid is uniform and consistent, so that it can further increase and decrease temperature expeditiously.

DETAILED DESCRIPTION OF THE DRAWINGS

Figure 1:
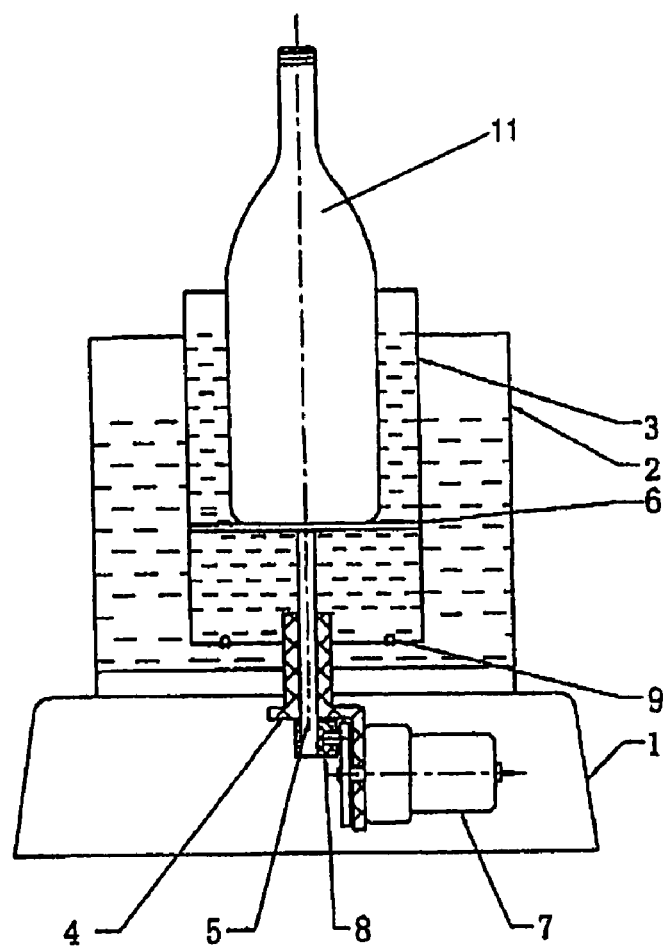
FIG. 1 is a schematic view of the adjuster for adjusting drink temperature according to a first embodiment of the present invention.

Preferred embodiments of the present invention will be described hereinafter in detail with reference to the attached drawings, wherein the like reference numerals refer to the like elements throughout the specification. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

According to the first and second embodiments shown in FIG. 1-4, the adjuster for adjusting drink temperature includes: a base 1; a container 2 arranged on the base 1; a stay bar seating 4 fixed on the base 1 and extending into the container 2 from the base of the container 2 and fixed to it; a stay bar device arranged in the stay bar seating 4 and formed as a muff coupling with the stay bar seating 4 without liquid, leakage, one end of thereof extending out of the stay bar seating 4 so as to form a supporting end and the other end thereof forming the driving end; and an actuating device disposed inside the base 1 and cooperating with the driving end of the stay bar device to drive the supporting end of stay bar device with a linear reciprocating movement. The actuating device includes: an actuating motor 7; and a converting mechanism which is cooperated with the driving end of the stay bar device and converts the rotational movement of the actuating motor into the linear reciprocating movement of the supporting end of the stay bar.

Figure 3:
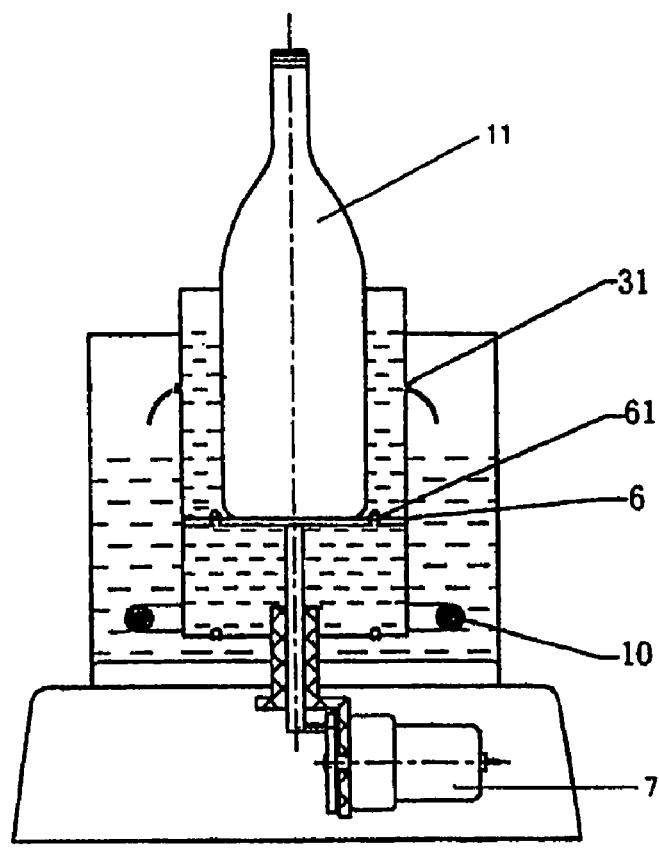
FIG. 3 is a schematic view of the adjuster for adjusting drink temperature according to a second embodiment of the present invention.
Figure 5:
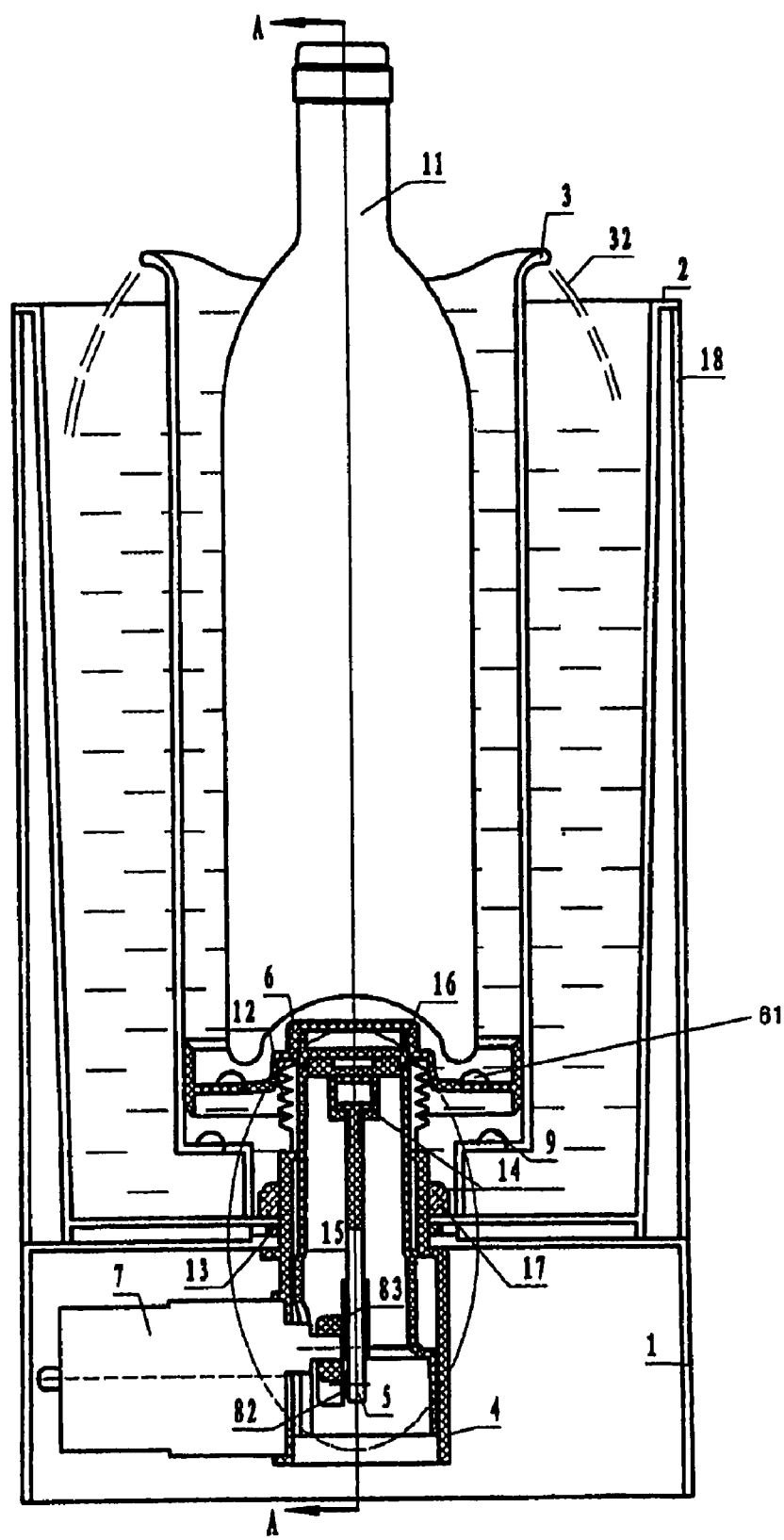
FIG. 5 is a schematic view of the adjuster for adjusting drink temperature according to a third embodiment of the present invention.

When using the adjuster for adjusting the drink temperature, as shown in FIG. 1 and FIG. 5, the bottle 11 is put in the container 2, with the bottom of the bottle being disposed on the supporting end of the stay bar device. In an embodiment as shown in FIGS. 1 and 3, the stay bar device can be a single stay bar 5. In this case, the supporting end of the stay bar device is integrated with the stay bar 5, thus, the structure of the present invention is simplified. After filling ice water or warm water in the container; the converting mechanism is driven when the motor is decelerated, thus converting rotational movement of the motor to a linear reciprocating movement. Accordingly, the stay bar device is caused to execute a reciprocating up and down movement; thereby driving the bottle with a up and down movement in the ice water or warm water. In this way, it is realized an animating effect to inspire drinking appetite, also it is propitious to flow the water and exchange the heat expeditiously.

Furthermore, according to the adjuster for adjusting the drink temperature of the present invention, it further comprises an inner muff 3 which is fixed in the container 2, the stay bar seating 4 extends out from the base of the muff 3, and divides the container 2 into a central and a peripheral section. The inner muff 3 provides at least one inlet hole 9 that allows the liquid to flow inside through the inlet hole. When cooling down the drink by ice, the inlet hole 9 and the inner muff 3 can operate to restrain the ice from getting into the inner muff 3, thus, the encumbrance between the stay bar 5 and the bottle 11 the moving process can be prevented and using ice water mixture to cool down the drink temperature is realized. The upper edge of the inner muff 3 is elevated so as to form a falling difference of the liquid while the liquid overflows, thus realizing a water fall effect. Preferably, the inlet hole is arranged on the bottom of the inner muff 3, and it is provided with a one-directional valve which ensure that the valve is closed when the bottle 11 is moving downwardly, and the liquid in the central section will not flow to the peripheral section through the bottom of the inner muff 3, thus it has sufficient amount of water to overflow so as to achieve the waterfall. Also, when the bottle is in the upward movement, the one-directional valve is opened, the liquid in the peripheral section flows to the central section via the valve and prepares for the next overflow.

As described above, a supporting end of the stay bar 5 supports a tray 6 which divides the inner muff 3 into two sections, a fluid passage is formed between the two sections, and the passing area of the fluid passage is not greater than the passing area of the inlet hole of the bottom of the inner muff 3. The fluid passage can be an interval defined between the tray 6 and the inner muff 3, the passing area of the interval is not greater than the passing area of the inlet hole. Alternatively, as shown in FIG. 3, the fluid passage can be a through aperture formed on the tray with a one-directional valve, thereby canceling the interval between the tray 6 and the inner muff 3, and the liquid can flow from the lower side to the upper side of the tray whereas the liquid from the upper side can not flow back to the lower side, so that the circulation of the liquid is also realized. More preferably, the liquid passage can be a combination of an interval between the tray 6 and the inner muff 3 and a one-directional valve formed on the tray 6.

The arrangement of tray 6 can solve the problem of different size of interval between the bottle and inner muff 3 produced due to the different bottle size. When the interval is bigger, the liquid therebetween is prone to flow back due to the deadweight and it is hard to overflow to bring a waterfall. In addition, when the passing area of the fluid passage is not greater than the passing area of the inlet hole of the bottom of the inner muff 3, as the tray 6 moves upwardly, the space under the tray 6 will be rapidly filled with the liquid from the peripheral section and it will drive the liquid remaining on the upper side of the tray overflow from the central section to the peripheral section, so that the waterfall is brought continuously.

According to the present invention, the stay bar seating 4 of the adjuster is fixed to the base I with one end extending out. The extending end of the stay bar seating 4 extends into the inner muff 3 through the container 2 and the bottom of the inner muff 3 and is formed as a fixture with the container 2 and the inner muff 3 without liquid leakage. It can be provided with a sealed ring which is pressed by the link member between the container 2 and the supporting end of the stay bar 5, to enhance sealing effect therebetween.

According to the present invention, a number of apertures 31 are formed on the upper portion of the sidewall of the inner muff 3. Such apertures are preferably provided in the same level, so that when the liquid in the inner muff 3 rises upwardly, the liquid is overflowed from such apertures to bring a fountain. A temperature adjusting device (not shown in the figures) is provided in the container, and the adjuster may comprise an electrothermal tube 10; and a temperature adjusting circuit 15 for controlling the heat of the electrothermal tube. When the electrothermal tube is heated, the liquid in the container can be heated so as to meet the requirement of drink warming. The temperature adjusting device further comprises semiconductor refrigerating pieces. Preferably, the adjuster may also comprise semiconductor refrigerating and warming pieces so the adjusting circuit 15 heats up or cools down the liquid in the container 2 in accordance with the requirements.

Figure 2:
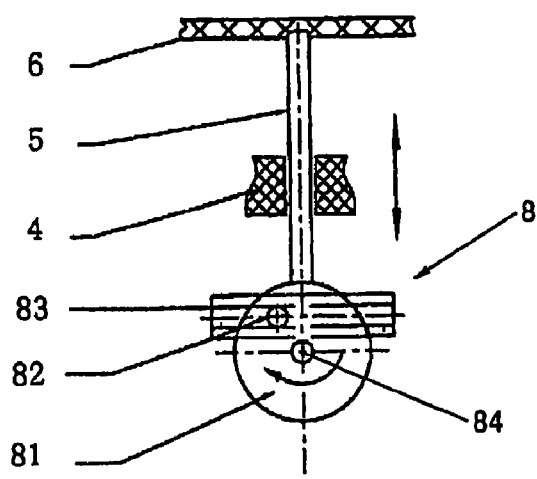
FIG. 2 is a plan view of a converting mechanism according to the first embodiment of the present invention in FIG. 1.

According to a converting mechanism of the adjuster for adjusting the drink temperature of the first embodiment of the present invention shown in FIGS. 1 and 2, the converting mechanism 8 comprises a turnplate 81, which is rotated by the driving of the output shaft 84 of the motor 7; a pin shaft 82 having one end which is eccentrically provided onto the turnplate 81 (not on the center of the turnplate); and a guiding path 83 which is fixed to the driving end of the stay bar 5, and the other end of the pin shaft 82 is fitted horizontally in the guiding path 83 in a sliding manner. By using such arrangement, it can convert the rotational movement of the turnplate 81 to the linear movement of the guiding path 83, thereby the reciprocating movement of the stay bar 5 is achieved. Furthermore, it can reduce the height of the converting mechanism so as to reduce the overall size of the adjuster.

Figure 4:
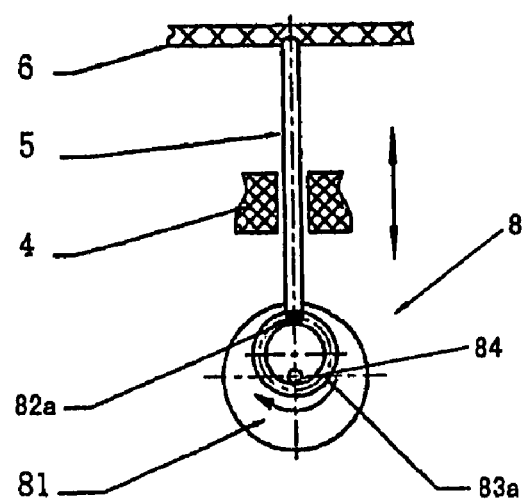
FIG. 4 is a plan view of a converting mechanism according to the second embodiment of the present invention in FIG. 3.

According to a converting mechanism of the adjuster for adjusting the drink temperature of the second embodiment of the present invention shown in FIGS. 3 and 4, the converting mechanism comprises a turnplate 81 which is rotated by the driving of the output shaft 84 of the motor 7; a pin shaft 82a having one end fixed to the driving end of the stay bar 5; and an annular guiding path 83a formed on the turnplate 81, the center of the annular guiding path 83a is offset from the center of the turnplate 81, the other end of the pin shaft 82a is slidably mounted in the annular guiding path, so as to convert the rotational movement of the turnplate 81 to the linear movement of the pin shaft 82a, thus the linear reciprocating movement of the stay bar 5 is achieved.

According to a converting mechanism of an adjuster for adjusting the drink temperature of a third and a fourth embodiments of the present invention shown in FIG. 5-8, the adjuster for adjusting the drink temperature comprises: a cylindrical shell 18; a base 1; a container 2 provided inside of the cylindrical shell 18 and arranged on the base 1; a stay bar seating 4 fixed on the base 1 and extending into the container 2 from the base of the container 2 and fix to it; a stay bar device arranged in the stay bar seating 4 and formed as a muff coupling with the stay bar seating 4 without liquid leakage, with one end of thereof extending out of the stay bar seating 4 so as to form a supporting end and the other end thereof forming the driving end; and an actuating device arranged in the base 1 and cooperating with the driving end of the stay bar device to drive the supporting end of the stay bar device with a linear reciprocating movement. The actuating device comprises: an actuating motor 7; and a converting mechanism 8, the converting mechanism cooperating with the driving end of the stay bar device and converting the rotational movement of the actuating motor 7 to the linear reciprocating movement of the supporting end of the stay bar device.

Furthermore, the adjuster for adjusting the drink temperature of the present invention further comprises an inner muff 3 fixed in the container 2, the stay bar seating 4 extends out from the base of the muff 3, and divides the container 2 into a central section and a peripheral section. The inner muff 3 is provided with an inlet hole 9 that allows the liquid flows inside. When using ice to cool down the drink, the inlet hole 9 and the inner muff 3 can operate to restrain the ice from entering into the inner muff 3, thus, the encumbrance between the stay bar 5 and the bottle 11 during the moving process can be prevented. In addition, when the top edge 32 of the inner muff 3 is elevated, the top edge forms an overflow water level over which water overflows from the inner muff 3, so as to form a falling difference of the overflowed liquid to bring a waterfall effect. Alternatively, a number of apertures 31 are formed on the upper portion of the sidewall of the inner muff 3, and such apertures 31 are preferably provided in the same level, so that when the liquid in the inner muff 3 rises upwardly, it passes through such apertures to bring a fountain. Preferably, the inlet hole 9 is preferably arranged on the bottom of the inner muff 3, and it is provided with a one-directional valve which ensure that the valve is closed when the bottle 11 moves downwardly, and the liquid in the central section will not flow to the peripheral section, thus it has sufficient amount to overflow for the waterfall. Also, when the bottle is in the upward movement, the one-directional valve is opened, the liquid in the peripheral section flows towards the central section and prepares for the next overflow.

Figure 7:
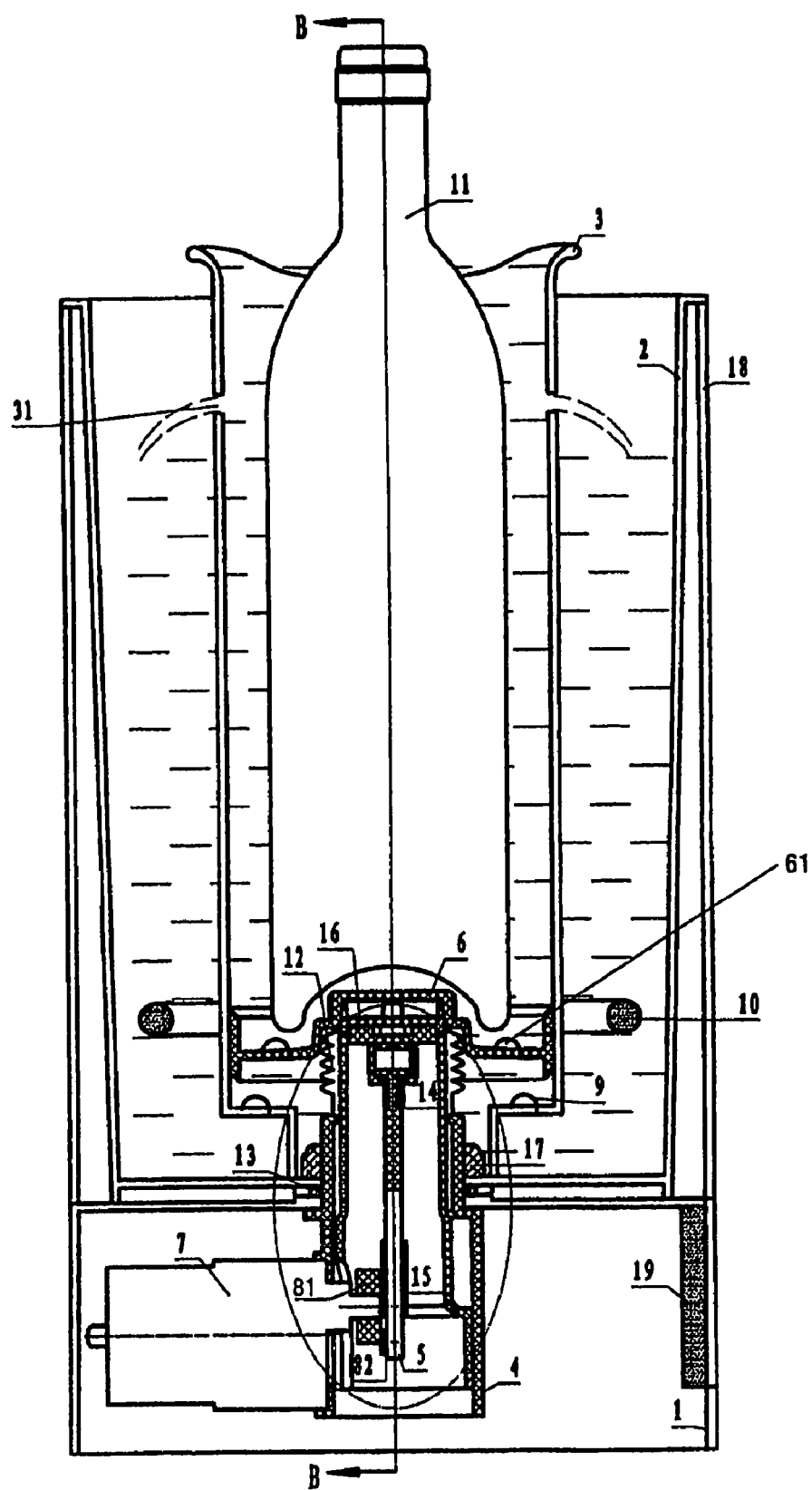
FIG. 7 is a schematic view of the adjuster for adjusting drink temperature according to a fourth embodiment of the present invention.

In the third and the fourth embodiments, shown in FIGS. 5 and 7, a stay bar device includes a stay bar 5; a stay bar base 14, one end of the stay bar 5 is the driving end, and the other end is pivotably connected to the stay bar base 14; and a stay bar muff 15 which is slidably engaged inside the stay bar seating 4, and the stay bar base 14 is fixed to the inner top of closed end of the stay bar muff 15. In the embodiments, one end of the stay bar 5 is coupled to a cylindrical member, and it forms an arc or semi-circular groove in a downward direction at the central area of the stay bar base 14. A through aperture is formed at the center of the groove, and the driving end of the stay bar 5 passes through the through aperture, so that the cylindrical member is located in the groove. In this way, the stay bar 5 swings in the through aperture, thus, the interference caused by the swinging stay bar 5 can be alleviated or cancelled. Further, a tray 6 can be provided on the stay bar base 14 through a tray connection member 16. The tray 6 divides the inner muff 3 into two sections, and a fluid passage is formed between the two sections, wherein the passing area of the fluid passage is not greater than the passing area of the inlet hole of the bottom of the inner muff 3. The fluid passage can be an interval defined between the tray 6 and the inner muff 3, and the passing area of the interval is not greater than the passing area of the inlet hole in the bottom of the inner muff 3. Alternatively, the fluid passage can be a through aperture of one-directional valve 61 which is formed on the tray 6, thereby canceling the interval between the tray 6 and the inner muff 3. As such, the liquid can flow in only one direction from the lower side to the upper side of the tray 6 whereas the liquid cannot backflow from the upper side to the lower side of the tray 6, so that the circulation of the liquid is also realized. More preferably, the liquid passage can be a combination of an interval between the tray 6 and the inner muff 3 and a one-way valve formed on the tray 6.

The stay bar seating 4 of the adjuster is fixed to the base with one end of the stay bar seating 4 extending out, the extending end of the stay bar seating 4 extends into the inner muff 3 through the container 2 and the base of the inner muff 3 and is formed as a fixture with the container 2 and the inner muff 3 without liquid leakage. A seal ring 13 which is compact by the link member 17 can be disposed between the container 2 and the supporting end of the stay bar 5, to enhance sealing effect therebetween. Preferably, shown in FIGS. 5 and 7, a seal muff 12 is provided between the stay bar seating 4 and the stay bar base 14, one end of the seal muff 12 is coupled and fixed to the stay bar seating 4 and the other end of the seal muff is fixed to the stay bar muff 15, so as to form a muff coupling with stay bar seating 4 without liquid leakage, so that the stay bar 5 is moveable in the stay bar seating 4. However, in the first and the second embodiments of the present invention, the sealed muff can be directly attached between the stay bar seating 4 and the supporting end of the stay bar 5.

A temperature adjusting device is provided in the container 2, and it may comprise an electrothermal tube 10 for controlling heating of the electrothermal tube so as to the liquid in the container, thereby meeting the requirement of drink warming. The temperature adjusting device further comprises semiconductor refrigerating pieces, preferably, the adjuster may comprise semiconductor refrigerating and warming pieces so that the adjusting circuit 15 heats up or cools down the liquid in the container 2 in accordance with the requirements.

Figure 6:
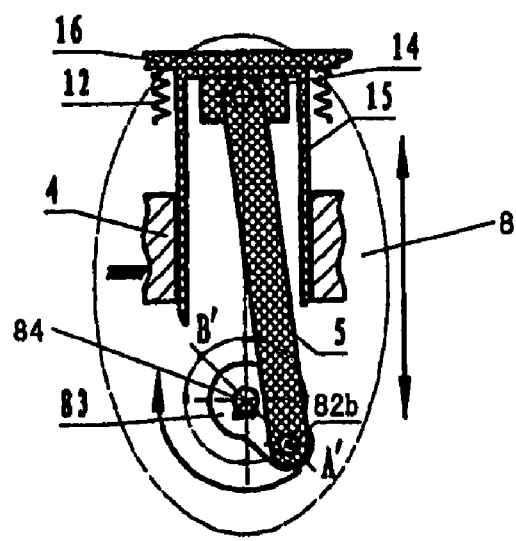
FIG. 6 is view of the converting mechanism in FIG. 5 in a direction indicated by arrow A-A.

According to the FIGS. 5 and 6, a converting mechanism 8 comprises a crank 83, which is rotated by the driving of the output shaft 84 of the motor 7; and a pin shaft 82b having one end fixed at the supporting end of the crank 83, and the other end is pivotably connected to the driving end of the stay bar 5.

Figure 8:
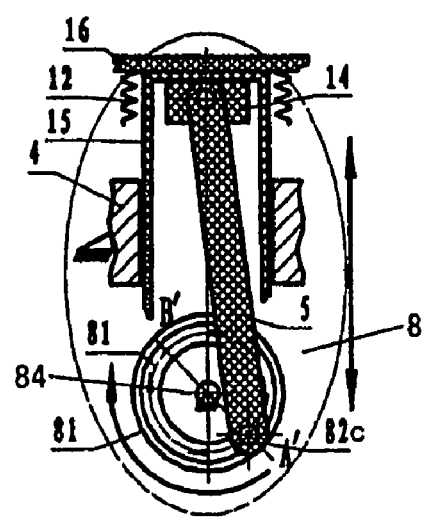
FIG. 8 is a view of the converting mechanism in FIG. 7 in a direction indicated by arrow B-B.

Alternatively, as a variant of the third embodiment of the present invention is shown in FIGS. 7 and 8, in the fourth embodiment, the crank 83 in the third embodiment can be replaced by the turnplate 81, one end of the pin shaft 82c is eccentrically provided on the turnplate 81, and the other end thereof is pivotably connected to the driving end of the stay bar 5, and the structure and the connection of the stay bar 15 is the same, the description thereof is omitted for purpose of brevity.

It would be appreciated by those skilled in the art that many modifications, alterations and substitutions may be made in these embodiments without departing from the principles and spirit of the invention, the scope of which is defined in the claims and their equivalents. For example, according to above embodiments, the converting mechanism can be achieved by means of four types, however, there are multiple methods and structures to achieve the converting mechanism. The technical solutions by means of substitutions of the converting mechanism are intended to fall within the scope of the invention. Accordingly, the four embodiments of the converting mechanism can not be construed as a restriction or limitation on the present invention and not limited to the four types or means of converting mechanisms.

What is claimed is:

1. An adjuster for adjusting drink temperature, comprising:
   a base;
   a container arranged on the base;
   a stay bar seating fixed on the base, said stay bar seating extending into the container from the base of the container and secured to the container;
   a stay bar device arranged in the stay bar seating and formed as a muff coupling with the stay bar seating without liquid leakage, one end thereof extending out of the stay bar seating and the other end thereof forming the driving end; and
   an actuating device cooperating with the driving end of the stay bar device to drive the stay bar device.

2. The adjuster for adjusting drink temperature of claim 1, further comprising an inner muff fixed in the container, wherein said stay bar seating extends out from the bottom of said inner muff, and the inner muff is provided with an inlet hole through which the liquid flows into it.

3. The adjuster for adjusting drink temperature of claim 2, wherein said inlet hole is arranged at the bottom of said inner muff and includes a one-directional valve.

4. The adjuster for adjusting drink temperature of claim 3, wherein a supporting end of said stay bar device supports a tray, said tray divides said inner muff into two sections, and a liquid passage is formed between the two sections, the passing area of said liquid passage is not greater than the passing area of said inlet hole arranged at the bottom of said inner muff.

5. The adjuster for adjusting drink temperature of claim 4, wherein said liquid passage is an interval defined between said tray and said inner muff.

6. The adjuster for adjusting drink temperature of claim 4, wherein said liquid passage is a through aperture formed on said tray with the one-directional valve.

7. The adjuster for adjusting drink temperature of claim 1, further comprising a seal muff, one end of said seal muff is connected and fixed to said stay bar seating, and the other end thereof is fixed to the supporting end of said stay bar device.

8. The adjuster for adjusting drink temperature of claim 1, said actuating device comprising:
   an actuating motor; and
   a converting mechanism, said converting mechanism converts the rotational movement of said actuating motor to a linear reciprocating movement of said stay bar device.

9. The adjuster adjusting drink temperature of claim 8, wherein said converting mechanism comprising:
   a turnplate, said turnplate is rotated by the driving of an output shaft of said actuating motor;
   a pin shaft, said pin shaft is eccentrically provided on said turnplate; and
   a guiding path, said guiding path is connected with the driving end of said stay bar device, and the other end of said pin shaft is slidably mounted in said guiding path.

10. The adjuster for adjusting drink temperature of claim 8, wherein said converting mechanism comprising:
    a turnplate, said turnplate is rotated by the driving of an output shaft of said actuating motor;
    a pin shaft, said pin shaft is eccentrically provided onto said turnplate; and
    an annular guiding path, said annular guiding path formed on said turnplate, and the other end of said pin shaft is slidably mounted in said annular guiding path.

11. The adjuster for adjusting drink temperature of claim 8, wherein said stay bar device comprising:
    a stay bar;
    a stay bar base, one end of said stay bar is configured as said driving end, the other end of said stay bar is pivotably connect to said stay bar base; and
    a stay bar muff, said stay bar muff is slidably engaged inside the stay bar seating, and one end of said stay bar muff is fixed to said stay bar base;
    said converting mechanism including:
    a crank, said crank is rotated by the driving of the output shaft of said motor; and
    a pin shaft, one end of said pin shaft is fixed at the supporting end of said crank, and the other end of said pin shaft is pivotably connected with said driving end.

12. The adjuster for adjusting drink temperature of claim 8, wherein said stay bar device comprising:
    a stay bar;
    a stay bar base, one end of said stay bar is configured as said driving end, the other end of said stay bar is pivotably connect to said stay bar base; and
    a stay bar muff, said stay bar muff is slidably engaged inside the stay bar seating, and one end of said stay bar muff is fixed with said stay bar base;
    wherein said converting mechanism including:
    a turnplate, said turnplate is rotated by the driving of the output shaft of said motor; and
    a pin shaft, one end of said pin shaft is eccentrically provided on said turnplate, and the other end of said pin shaft is pivotably connected with said driving end.

13. The adjuster for adjusting drink temperature of claim 2, wherein a number of overflow apertures are formed on an upper portion of a sidewall of said inner muff.

14. The adjuster for adjusting drink temperature of claim 1, wherein said container is provided therein with a temperature adjusting device.

15. The adjuster for adjusting drink temperature of claim 14, wherein said temperature adjusting device comprising semiconductor refrigerating pieces.

16. The adjuster for adjusting drink temperature of claim 14, wherein said temperature adjuster comprising semiconductor refrigerating and heating pieces.

17. The adjuster for adjusting drink temperature of claim 1, further including a seal ring which is compacted by a link member the seal ring provided between said container and said stay bar seating.

* * * * *

UNITED STATES PATENT AND TRADEMARK OFFICE
CERTIFICATE OF CORRECTION

PATENT NO. : 7,663,331 B2 Page 1 of 1
APPLICATION NO. : 11/791779
DATED : February 16, 2010
INVENTOR(S) : Zhuang It is certified that error appears in the above-identified patent and that said Letters Patent is hereby corrected as shown below:

Title Page
Insert Field 30:

--(30)  Foreign Application Priority Data
      Nov. 29, 2004    (CN)          200420095995.6--

Signed and Sealed this

Twenty-third Day of March, 2010

David J. Kappos
*Director of the United States Patent and Trademark Office*